(12) United States Patent
Frodsham et al.

(10) Patent No.: US 7,610,522 B2
(45) Date of Patent: Oct. 27, 2009

(54) COMPLIANCE OF MASTER-SLAVE MODES FOR LOW-LEVEL DEBUG OF SERIAL LINKS

(75) Inventors: Timothy Frodsham, Portland, OR (US); Zale Schoenborn, Portland, OR (US); Sanjay Dabral, Palo Alto, CA (US); Muraleedhara H. Navada, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 763 days.

(21) Appl. No.: 11/322,060

(22) Filed: Dec. 28, 2005

(65) Prior Publication Data

US 2007/0168755 A1   Jul. 19, 2007

(51) Int. Cl.
*G01R 31/28* (2006.01)

(52) U.S. Cl. ..................... 714/712; 714/715

(58) Field of Classification Search ................ 714/712, 714/715, 716, 735, 736, 819, 799; 370/328
See application file for complete search history.

(56) References Cited

U.S. PATENT DOCUMENTS

| 7,346,819 | B2 * | 3/2008 | Bansal et al. | 714/726 |
| 7,353,443 | B2 * | 4/2008 | Sharma | 714/742 |
| 7,444,558 | B2 * | 10/2008 | Mitbander et al. | 714/716 |
| 7,512,087 | B2 * | 3/2009 | Yoshikawa et al. | 370/328 |

* cited by examiner

*Primary Examiner*—Phung M Chung
(74) *Attorney, Agent, or Firm*—Blakely, Sokoloff, Taylor & Zafman LLP

(57) ABSTRACT

A condition is detected to cause a component having physical layer circuitry with a transmitter and a receiver to enter a testing state. The transmitter transmits a pre-selected data pattern while comparing data received by the receiver to the pre-selected data pattern during a first phase of the testing state. The transmitter transmits data received by the receiver without comparing the data received by the receiver to the pre-selected data pattern during a second phase of the testing state.

20 Claims, 4 Drawing Sheets

COMPLIANCE OF MASTER-SLAVE MODES FOR LOW-LEVEL DEBUG OF SERIAL LINKS

TECHNICAL FIELD

Embodiments of the invention relate to debug modes for physical links in electronic systems. More specifically, embodiments of the invention relate to support of use of instrumentation to monitor operation of a physical link in an electronic system.

BACKGROUND

Some physical link specifications incorporate self-test hooks that can be used to collect, for example, eye diagrams, equivalent time oscilloscope traces and/or bit error rate diagrams. In order to use these hooks, the physical link under test must complete a training sequence. However, if a link is non-functional the training sequence cannot be completed and the self-test hooks cannot be used.

One example of a self-test hook is the compliance state as documented in the PCI Express standards. The PCI Express standards refer to documents available from the PCI Special Interest Group of Portland, Oreg. The compliance state of the PCI Express standards provides a mechanism by which an oscilloscope probe or other instrument can be connected to a physical link. As the link detects the probe or other instrument it may enter the compliance state. In the compliance state the transmitter sends a predetermined pattern on each of the lines on which the probe or other instrument has been detected. In the compliance state external test equipment can monitor the functionality of the transmitter.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Figure 1:
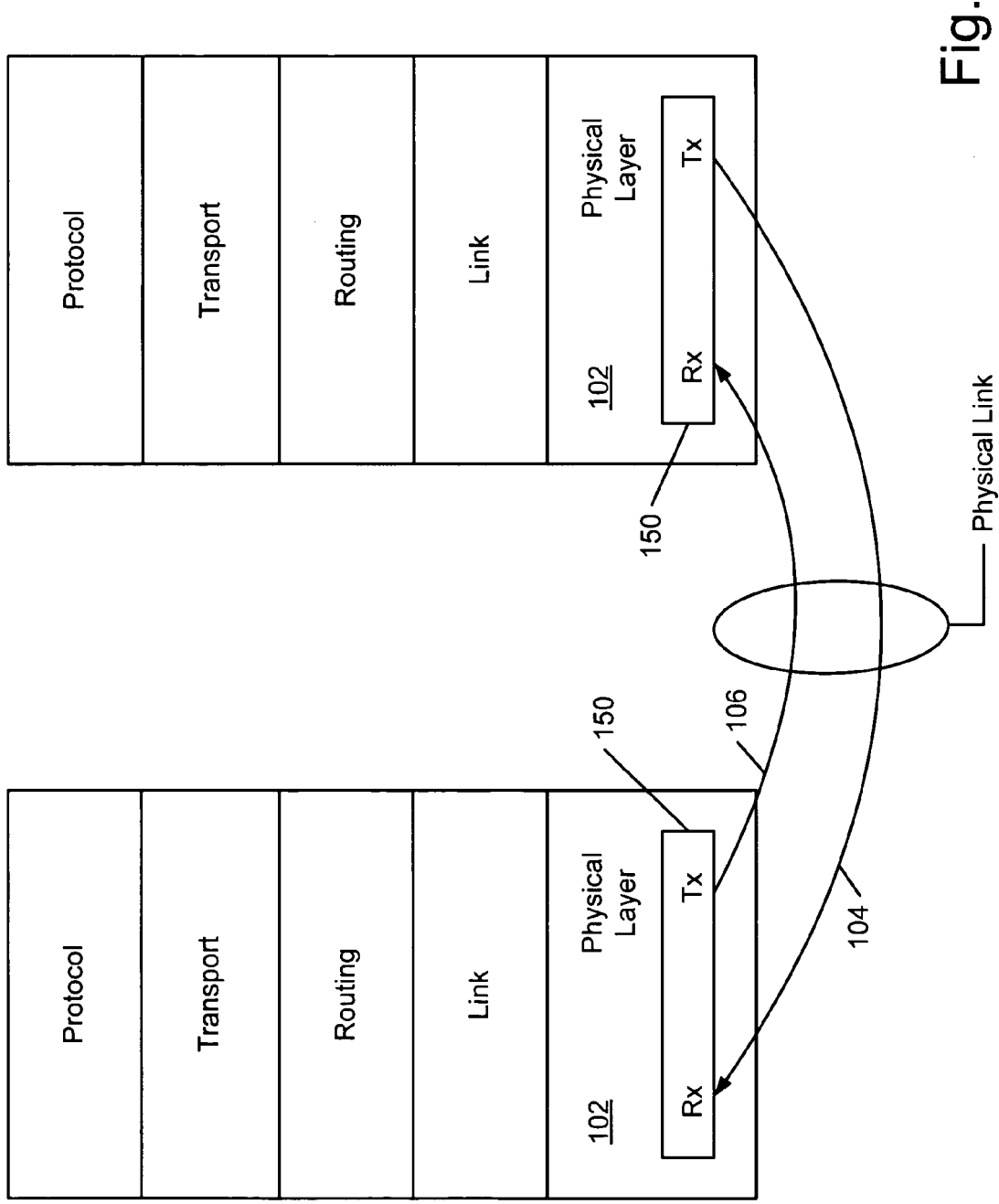
FIG. 1 is a block diagram of one embodiment of an apparatus for a physical interconnect.

FIG. 1 is a block diagram of one embodiment of an apparatus for a physical interconnect. In one aspect, the apparatus depicts a physical layer for a cache-coherent, link-based interconnect scheme for a processor, chipset, and/or 10 bridge components. For example, the physical interconnect may be performed by each physical layer of an integrated device. The physical interconnect may support training and testing in association with use of an oscilloscope probe or other test equipment to monitor the physical interconnect.

Specifically, the physical layer may provide communication between two ports over a physical interconnect comprising two uni-directional links. Specifically, one uni-directional link 104 from a first transmit port 150 of a first integrated device to a first receiver port 150 of a second integrated device. Likewise, a second uni-directional link 106 from a first transmit port 150 of the second integrated device to a first receiver port 150 of the first integrated device. However, the claimed subject matter is not limited to two uni-directional links.

Figure 2:
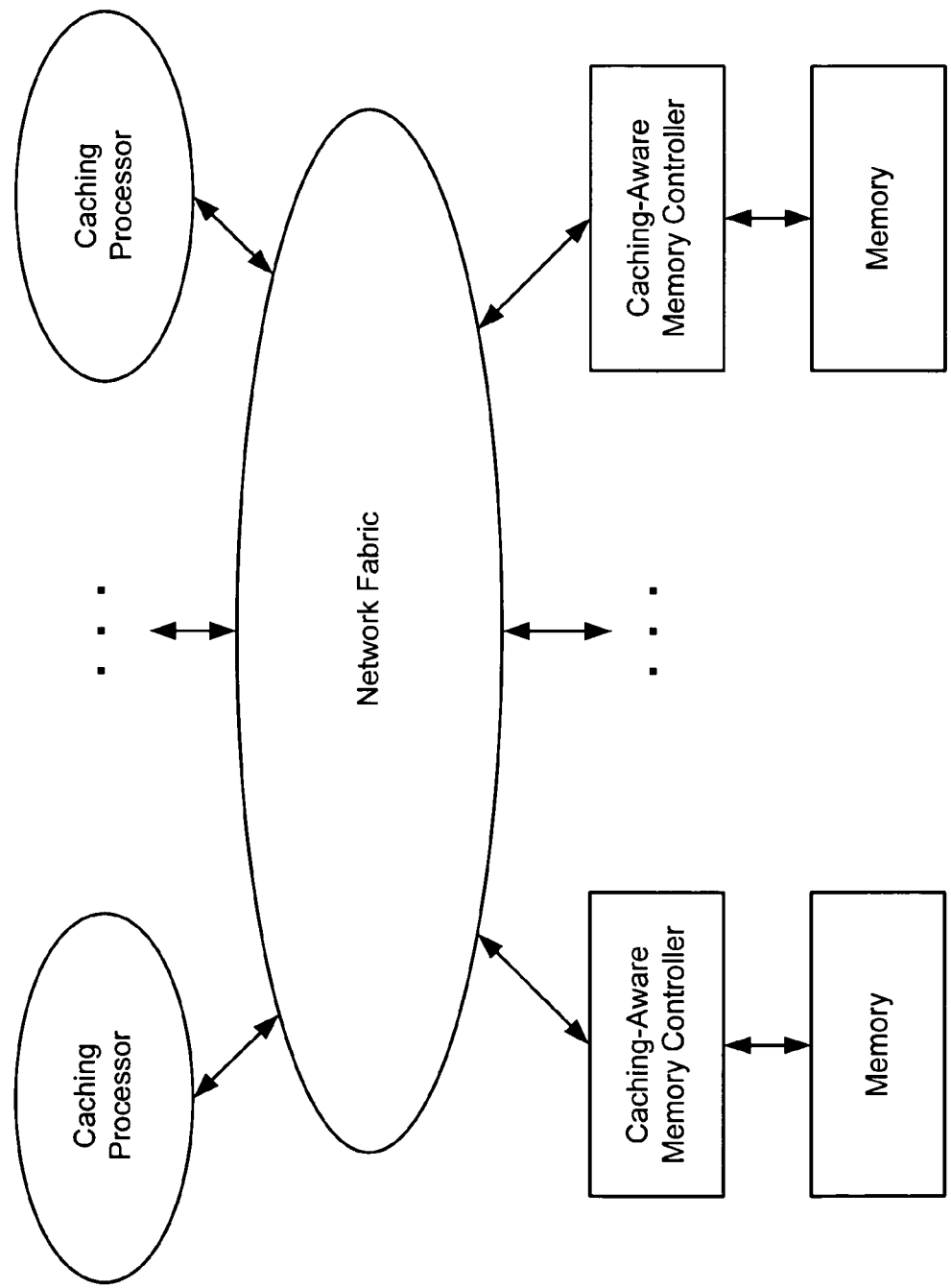
FIG. 2 is a conceptual illustration of one embodiment of a system that may utilize point-to-point interconnects that may carry in-band reset signals.

FIG. 2 is a conceptual illustration of one embodiment of a system that may utilize point-to-point interconnects that may carry in-band reset signals. In one embodiment, the system of FIG. 2 may utilize a point-to-point architecture that supports a layered protocol scheme. In one embodiment, the system may include a plurality of caching agents and home agents coupled to a network fabric. For example, the network fabric may adhere to a layered protocol scheme and comprised of: a physical layer, a link layer, a routing layer, a transport layer and a protocol layer (as depicted in connection with FIG. 1). The fabric may facilitate transporting messages from one protocol (home or caching agent) to another protocol for a point-to-point network.

FIG. 2 is a high level, simplified abstraction of a protocol architecture that may utilize one or more point-to-point links. The fabric may facilitate transporting messages from one protocol (caching processor or caching aware memory controller) to another protocol for a point-to-point network. Each caching-aware memory controller may be coupled with memory that may include, for example, dynamic random access memory (DRAM), flash memory, or any other type of memory known in the art.

As described in greater detail below, the compliance state may be expanded to include a master-slave behavior. In one embodiment, this includes a forces loop back mode where a slave re-transmits received data and a master may generate and transmit loop back pattern data. The master may compare the re-transmitted data against the transmitted pattern data. In one embodiment, the expanded compliance state may be entered directly from a reset state. In one embodiment, no training is required to enter the expanded compliance state.

Figure 3:
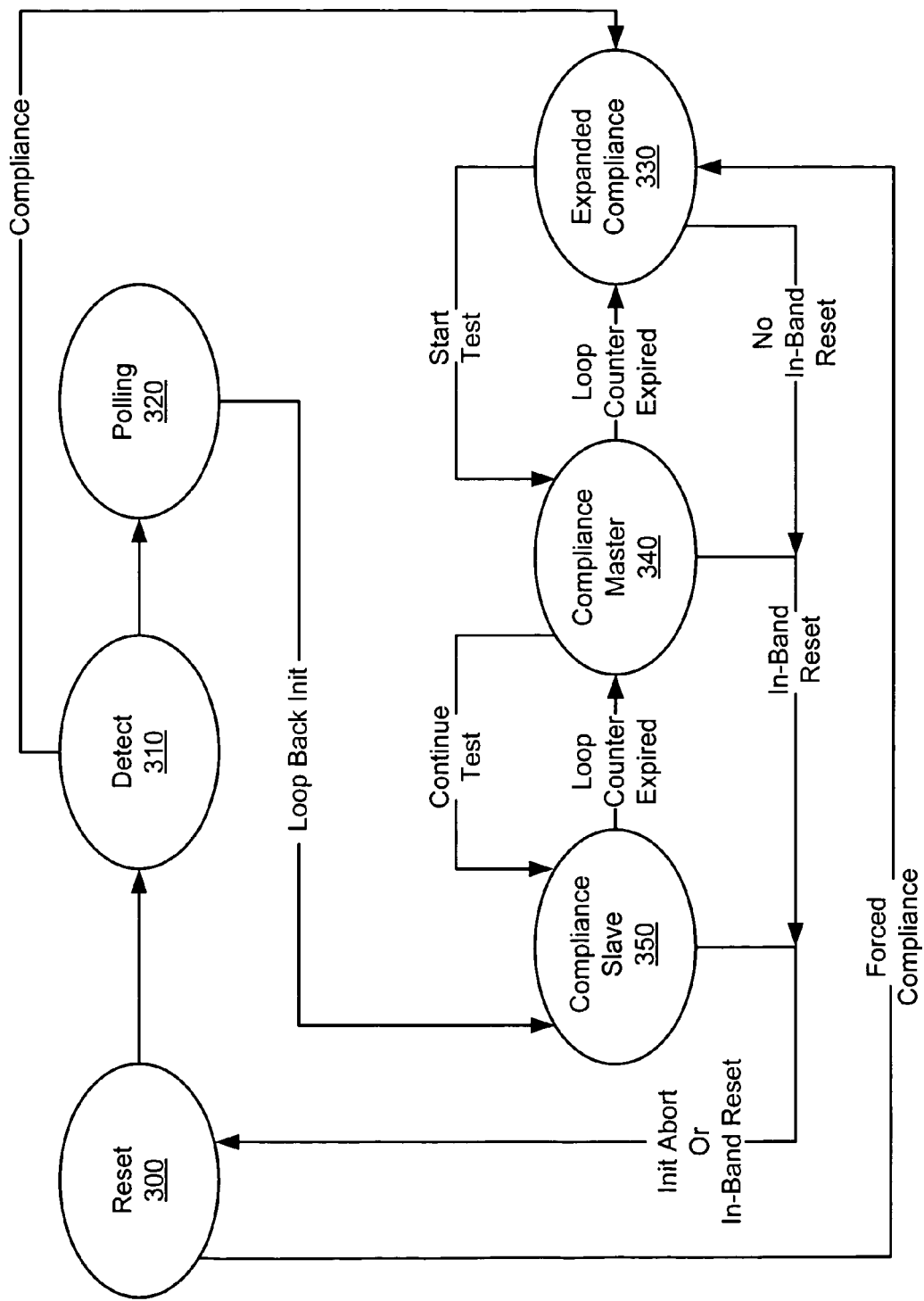
FIG. 3 is a state diagram corresponding to one embodiment of a physical link architecture that may support an expanded compliance state.

FIG. 3 is a state diagram corresponding to one embodiment of a physical link architecture that may support an expanded compliance state. The state diagram of FIG. 3 may correspond to a state machine in either one or both of the physical layers as illustrated, for example, in FIG. 1. The data patterns may be transmitted over a physical link coupled between the two physical layers.

In one embodiment, from reset state 300, a forced compliance signal may cause the state machine to transition to expanded compliance state 330. In one embodiment, the forced compliance signal allows for manual triggering of a testing environment via the expanded compliance state.

In one embodiment, absent the forced compliance signal, the state machine may transition from reset state 300 to detect state 310. In detect state 310, the state machine may determine whether a probe or other instrument is connected to the physical link to which the state machine is coupled. If a probe or other instrument is detected, the state machine may transition from detect state 310 to expanded compliance state 330.

In one embodiment, in expanded compliance state 330, a start test condition may cause the state machine to transition to compliance master state 340. In compliance master state 340, the state machine may cause a pre-selected data pattern to be transmitted over the physical link. This may allow the probe or instrument coupled with the physical link to determine whether the pre-selected pattern has been transmitted.

In one embodiment, in compliance master state 340, a receiver on the opposite end of the physical link may be active and coupled with a comparison circuit that may compare the received data to the pre-selected pattern. Thus, in compliance master state 340, a transmitter on a first end of the physical link, the physical link and a receiver on a second end of the physical link may be tested by monitoring for the pre-selected pattern. If the pre-selected pattern is not detected, one or more of these components may be malfunctioning.

In one embodiment, upon completion of testing in compliance master state 340, the state machine may transition to compliance slave state 350. In one embodiment, in compliance slave state 350 a port may loop back, or re-transmit, data received by the port. By monitoring the receiver in compliance master state 340 and the transmitter in compliance slave state 350, the state machine may determine whether any of the individual transmission, receiving and/or physical link components is malfunctioning.

In one embodiment, in either compliance master state 340 or compliance slave state 350, if an in-band reset is received, the state machine may transition to reset state 300. In one embodiment, in either compliance master state 340 or compliance slave state 350, if a loop counter has expired the state machine may transition to expanded compliance state 330. Expiration of the loop counter may indicate, for example, a specified number of repetitions of the pre-selected data pattern have been or should have been transmitted or received.

Figure 4:
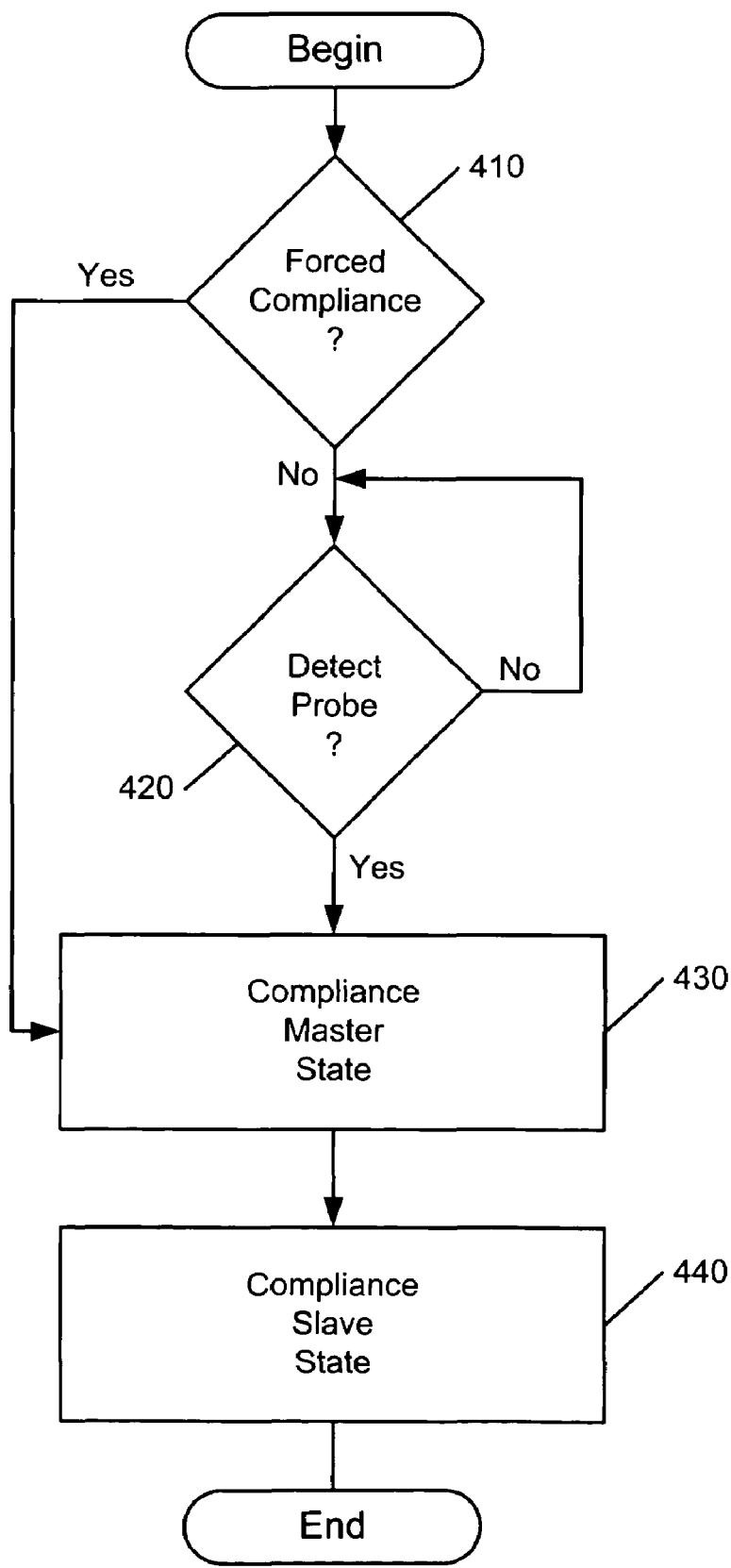
FIG. 4 is a flow diagram of one embodiment of operation of a port coupled to a physical link that may support an expanded compliance state.

FIG. 4 is a flow diagram of one embodiment of operation of a port coupled to a physical link that may support an expanded compliance state. In one embodiment, the port may determine whether a forced compliance condition exists, 410. In one embodiment, if the forced compliance condition exists, 410, the port may transition to the compliance master state, 430, which is described in greater detail below.

If the forced compliance condition does not exist, 410, the port may determine whether a probe or other instrument is coupled with a physical link, 420. Any technique for determining whether a probe or other instrument is coupled to the physical link may be utilized. If a probe of other instrument is detected, 420, the port may transition to the expanded compliance state, which, in one embodiment, includes a master state portion and a slave state portion.

In one embodiment, when the port is in compliance master state, 430, data may be transmitted over all detected physical links. The transmitted data may correspond to a pre-selected pattern so that data collected by the probe may be compared to the pre-selected pattern for debugging purposes. In one embodiment, in the compliance master state, the port receiver may be active as well as any internal comparison logic. The comparison logic may compare received data with the pre-selected pattern to provide further debugging information.

At the conclusion of the compliance master state, 430, the port may transition to the compliance slave state, 440. In one embodiment, when the port is in the compliance slave state, 440, data that is received via the port receiver is transmitted via the port transmitter. In one embodiment, comparison based on the received data is not performed in the compliance slave state.

Thus, in the compliance master state the transmitter of the port and the physical link may be tested. By comparing the transmitted data to the pre-selected pattern of data transmitter functionality may be verified. In the compliance slave state the receiver of the port may be tested. By comparing the re-transmitted data and the pre-selected pattern of data receiver functionality may be verified. In one embodiment, the compliance master state is completed before entering the compliance slave state so that the functionality of the transmitter used to re-transmit received data may be verified prior to the re-transmission. This may allow defects to be more easily isolated.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   detecting a condition to cause a component having physical layer circuitry with a transmitter and a receiver to enter a testing state;
   causing the transmitter to transmit a pre-selected data pattern while comparing data received by the receiver to the pre-selected data pattern during a first phase of the testing state; and
   causing the transmitter to transmit data received by the receiver without comparing the data received by the receiver to the pre-selected data pattern during a second phase of the testing state.

2. The method of claim 1 wherein the transmitter transmits the pre-selected data pattern over a point-to-point physical link during the first phase of the testing state.

3. The method of claim 1 wherein the receiver receives data over a point-to-point physical link during the second phase of the testing state.

4. The method of claim 1 wherein detecting the condition to cause the component having physical layer circuitry to enter the testing state comprises detecting presence of a test instrument connected to a physical link coupled with the physical layer circuitry.

5. The method of claim 1 wherein detecting the condition to cause the component having physical layer circuitry to enter the testing state comprises detecting assertion of a forced compliance signal.

6. An apparatus comprising:
   means for detecting a condition to cause a component having physical layer circuitry with a transmitter and a receiver to enter a testing state;
   means for causing the transmitter to transmit a pre-selected data pattern while comparing data received by the receiver to the pre-selected data pattern during a first phase of the testing state; and
   means for causing the transmitter to transmit data received by the receiver without comparing the data received by the receiver to the pre-selected data pattern during a second phase of the testing state.

7. The apparatus of claim 6 wherein the transmitter transmits the pre-selected data pattern over a point-to-point physical link during the first phase of the testing state.

8. The apparatus of claim 6 wherein the receiver receives data over a point-to-point physical link during the second phase of the testing state.

9. The apparatus of claim 6 wherein the means for detecting the condition to cause the component having physical layer circuitry to enter the testing state comprises means for detecting presence of a test instrument connected to a physical link coupled with the physical layer circuitry.

10. The apparatus of claim 6 wherein the means for detecting the condition to cause the component having physical layer circuitry to enter the testing state comprises means for detecting assertion of a forced compliance signal.

11. A physical layer interface comprising:
   a transmission port to transmit data;
   a receiving port to receive data;
   comparison circuitry; and
   control circuitry coupled with the transmission port, with the receiving port, and with the comparison circuitry, the control circuitry to selectively enter a testing state having at least two phases, wherein during the first phase the control circuitry causes the transmission port to transmit a pre-selected data pattern and also to cause the comparison circuitry to compare data received by the receiving port to the pre-selected pattern, and further wherein during the second phase the control circuitry causes the transmission port to transmit data received by the receiving port.

12. The apparatus of claim 11 wherein the transmission port transmits the pre-selected data pattern over a point-to-point physical link during the first phase of the testing state.

13. The apparatus of claim 11 wherein the receiving port receives data over a point-to-point physical link during the second phase of the testing state.

14. The apparatus of claim 11 wherein selectively entering the testing state comprises the control circuit detecting presence of a test instrument connected to a physical link coupled with the physical layer circuitry.

15. The apparatus of claim 11 wherein selectively entering the testing state comprises detecting assertion of a forced compliance signal.

16. A system comprising:
   a transmission port to transmit data;
   a receiving port to receive data;
   a dynamic random access memory;
   comparison circuitry; and
   control circuitry coupled with the transmission port, with the receiving port, with the comparison circuitry, and with the dynamic random access memory, the control circuitry to selectively enter a testing state having at least two phases, wherein during the first phase the control circuitry causes the transmission port to transmit a pre-selected data pattern and also to cause the comparison circuitry to compare data received by the receiving port to the pre-selected pattern, and further wherein during the second phase the control circuitry causes the transmission port to transmit data received by the receiving port.

17. The system of claim 16 wherein the transmission port transmits the pre-selected data pattern over a point-to-point physical link during the first phase of the testing state.

18. The system of claim 16 wherein the receiving port receives data over a point-to-point physical link during the second phase of the testing state.

19. The system of claim 16 wherein selectively entering the testing state comprises the control circuit detecting presence of a test instrument connected to a physical link coupled with the physical layer circuitry.

20. The system of claim 16 wherein selectively entering the testing state comprises detecting assertion of a forced compliance signal.

* * * * *

UNITED STATES PATENT AND TRADEMARK OFFICE
CERTIFICATE OF CORRECTION

PATENT NO.      : 7,610,522 B2  
APPLICATION NO. : 11/322060  
DATED           : October 27, 2009  
INVENTOR(S)     : Frodsham et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 960 days.

Signed and Sealed this

Twelfth Day of October, 2010

David J. Kappos  
*Director of the United States Patent and Trademark Office*